(12) United States Patent
Huijbrechts et al.

(10) Patent No.: US 8,076,871 B2
(45) Date of Patent: Dec. 13, 2011

(54) DRIVER APPARATUS FOR A GAS DISCHARGE LAMP

(75) Inventors: Paulus Adrianus Hypolytus Jozef Huijbrechts, Eindhoven (NL); Godfried Cornelius Gerardus Maria Manders, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 231 days.

(21) Appl. No.: 12/596,850

(22) PCT Filed: Apr. 18, 2008

(86) PCT No.: PCT/IB2008/051494
§ 371 (c)(1),
(2), (4) Date: Oct. 21, 2009

(87) PCT Pub. No.: WO2008/132646
PCT Pub. Date: Nov. 6, 2008

(65) Prior Publication Data
US 2010/0134030 A1 Jun. 3, 2010

(30) Foreign Application Priority Data
Apr. 27, 2007 (EP) .................................. 07107072

(51) Int. Cl.
*G05F 1/00* (2006.01)
(52) U.S. Cl. ..... 315/309; 315/224; 315/247; 315/209 R; 315/291

(58) Field of Classification Search ................ 315/224, 315/225, 209 R, 247, 291, 307–311
See application file for complete search history.

(56) References Cited

U.S. PATENT DOCUMENTS

| 6,191,537 B1 | 2/2001 | Celso |
| 6,392,365 B1 | 5/2002 | Zhou et al. |
| 2002/0130626 A1 | 9/2002 | Okamoto et al. |
| 2004/0004447 A1* | 1/2004 | Trostl et al. ................... 315/291 |
| 2004/0257001 A1 | 12/2004 | Langeslag et al. |
| 2005/0146285 A1 | 7/2005 | Lurkens |

FOREIGN PATENT DOCUMENTS

| WO | 9638024 A1 | 11/1996 |
| WO | 03039206 A1 | 5/2003 |

* cited by examiner

Primary Examiner — Tuyet Thi Vo

(57) ABSTRACT

A driver apparatus (100) for driving a gas discharge lamp (L) comprises a commutator circuit (5) having a bridge topology with four switches (T1-T4) controlled by a controller (6), with an inductor (L2) arranged in series with the lamp and a capacitor (C3) arranged in parallel with the lamp, the inductor (L2) and the capacitor (C3) having a parallel resonance frequency $f_R$. In a steady-state mode, the controller drives the four switches (T1-T4) at a relatively low commutation frequency of the order of 100 Hz. For igniting the lamp when it is still hot, the controller drives the four switches (T1-T4) at a first ignition frequency $f_{P1}=f_R/n1$, n1 being an odd integer. For igniting the lamp when it is cold, the controller drives the four switches (T1-T4) at a second ignition frequency $f_{P2}=f_R/n2$, n2 being an odd integer larger than n1.

10 Claims, 3 Drawing Sheets

DRIVER APPARATUS FOR A GAS DISCHARGE LAMP

FIELD OF THE INVENTION

The present invention relates in general to the field of discharge lamps, particularly High Intensity Discharge (HID) lamps, i.e. high-pressure lamps, such as, for instance, high-pressure sodium lamps, high-pressure mercury lamps, and metal halide lamps.

BACKGROUND OF THE INVENTION

Gas discharge lamps are commonly known, and an elaborate description of the design of such lamps is therefore not necessary in this document. A gas discharge lamp comprises two electrodes located in a closed vessel filled with an ionizable gas or vapor. The vessel is typically quartz or a ceramic material, for instance, polycrystalline alumina (PCA). The electrodes are arranged at a certain distance from each other, and an electric arc is maintained between these electrodes during operation.

A gas discharge lamp may be powered by an electronic driver. Electronic drivers are commonly known, and an elaborate description of the design of such electronic drivers is therefore not necessary in this document. The driver has two important tasks. One task is maintaining a gas discharge during steady-state operation; in a typical design, the driver produces a commutating current applied to the lamp at a commutation frequency of the order of about 100 Hz. However, in principle, direct current operation is also possible. In other design variants, lower or higher commutation frequencies are also possible. Another task of the driver is igniting the lamp when it is off. Typically, this is achieved by applying, in an ignition phase, a voltage signal at a relatively high voltage. In principle, this may be a constant voltage, but better results are obtained by applying voltage pulses or a resonant voltage.

The present invention particularly relates to an electronic driver having an ignition functionality on the basis of a resonant voltage.

An important problem related to ignition is that the voltage required for ignition depends on the condition of the lamp. Particularly when the lamp has just extinguished and is still hot, the voltage required for re-ignition may be much higher as compared to the situation when the lamp is cold. For instance, the ratio between the required re-ignition voltage in a hot condition and this voltage in a cold condition may be at least 2, and even 7 or 8. To ensure that the lamp ignites whatever its condition, it should therefore be possible to always apply the high voltage required for hot re-ignition. However, this high voltage, which may be as high as 5 to 8 kV in favorable situations, is still so high that it may reduce the lifetime of the lamp if applied without reason. Furthermore, in the case of a broken lamp, components in the path from the driver to the lamp get damaged by the high voltage. It is therefore desirable to apply a lower ignition voltage for cold ignition.

One possible way of overcoming this problem is to use two igniters: one for applying a relatively "low" high voltage when the lamp is cold, and another for applying a "higher" high voltage when the lamp is hot. However, such a solution is not practical and is expensive.

OBJECT AND SUMMARY OF THE INVENTION

It is an object of the present invention to eliminate or at least reduce the above-mentioned problems.

According to an important aspect of the present invention, a driver comprises an igniter which is capable of generating at least two different ignition signals at mutually different voltage levels. Furthermore, the driver is capable of automatically deciding which of these ignition signals is to be applied.

For generating the two different ignition signals, the igniter is capable of operating at two different operational frequencies, controlled by a controller. Without additional hardware, a single igniter is thus capable of generating adequate ignition signals for cold ignition as well as for a hot restrike.

In a possible embodiment, the driver measures the time that passes since the extinction of the lamp. If a command for re-ignition is received, the driver checks this time: if it is below a predetermined threshold, the lamp is considered to be "hot" and the ignition signal with the highest voltage is applied. If, in contrast, the time is longer than the predetermined threshold, the lamp is considered to be "cold" and the ignition signal with the lowest voltage is applied.

In another possible embodiment, the driver always applies both ignition signals sequentially: first, the ignition signal with the lowest voltage and secondly, the ignition signal with the highest voltage is applied. If the lamp is cold, the lamp will ignite on the low-voltage ignition signal, which will prevent the high-voltage ignition signal from being applied. If the lamp is hot, the low-voltage ignition signal will be insufficient for ignition, so that the high-voltage ignition signal will be generated automatically.

Further advantageous elaborations are defined in the dependent claims.

It is noted that US-2004/0257001 discloses a ballast arrangement for starting and operating a discharge lamp, wherein an igniter is capable of generating at least two different ignition signals at mutually different frequencies and voltage levels. After ignition, the frequency of the ignition signal is reduced stepwise during a warm-up and/or take-over phase in the arrangement described in said publication. In contrast, according to the present invention, the frequency of the ignition signal is increased stepwise if so required for ignition.

BRIEF DESCRIPTION OF THE DRAWINGS

These and other aspects, features and advantages of the present invention will be elucidated by way of the following description of one or more preferred embodiments with reference to the drawings, in which identical reference numerals denote the same or similar parts, and in which.

DESCRIPTION OF EMBODIMENTS

Figure 1:
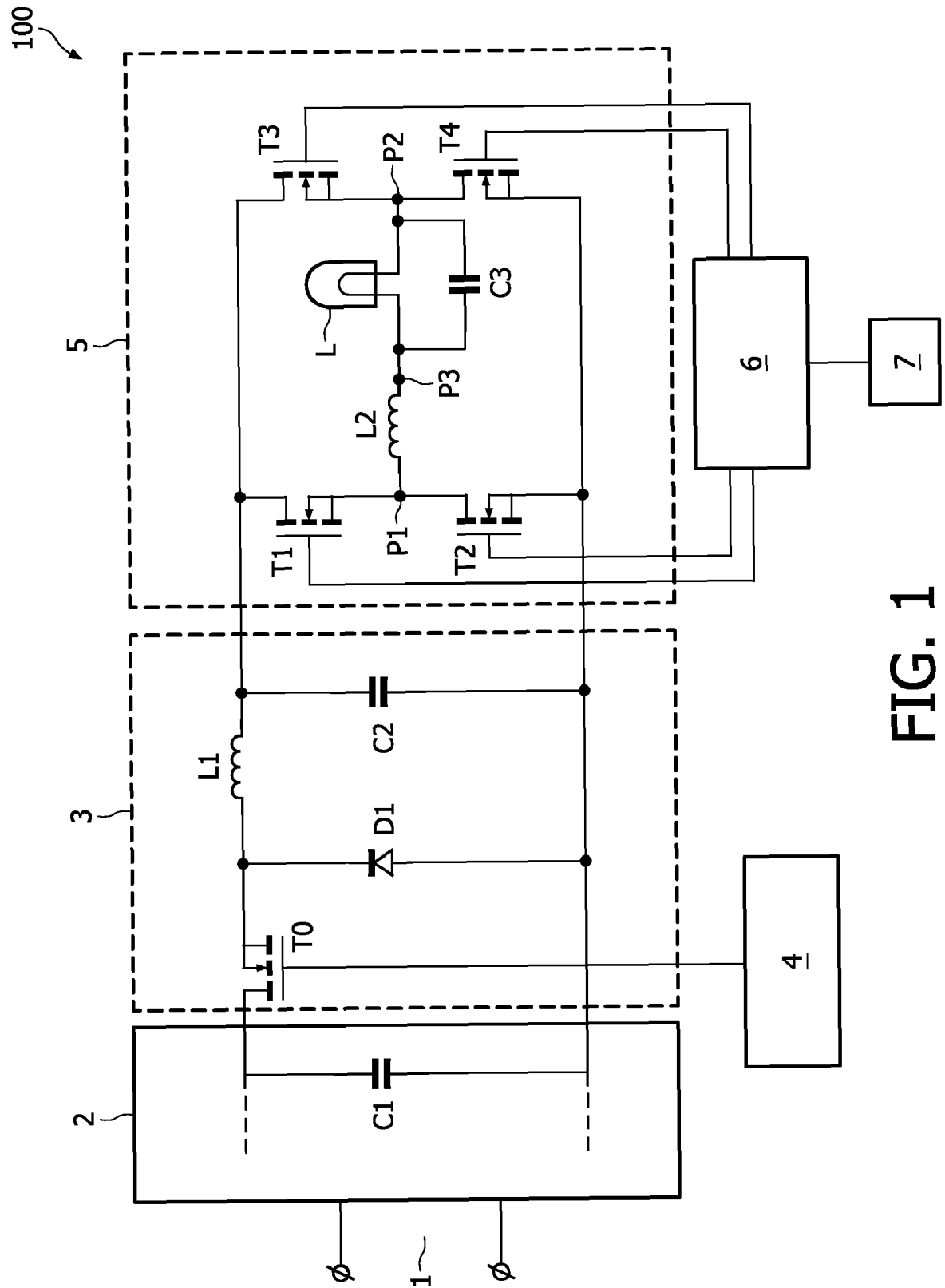
FIG. 1 is a block diagram schematically showing an electronic driver.

FIG. 1 is a block diagram schematically showing the design of a possible embodiment of an electronic driver 100 according to the present invention, for driving a discharge lamp L. The lamp L is, for example, a HID or a UHP lamp. The driver 100 comprises an AC/DC converter circuit 2 for rectifying an AC input voltage received from an AC voltage mains 1, which converter circuit comprises a capacitor C1 as an output capacitor. Since such an AC/DC converter circuit is known per se, its design and operation will not be described in detail.

The driver 100 further comprises a controlled/switched DC/DC converter circuit 3, also referred to as "chopper", having an input receiving the DC voltage supplied by the converter circuit, and an output supplying the lamp current. The chopper may comprise a switching transistor T0, a coil L1 connected in series with the switching transistor T0, an output capacitor C2 connected parallel to the output terminals, and a diode D1 connected to the node between the switching transistor T0 and the coil L1. Since such a chopper circuit is known per se, its design and operation will not be described in detail. The switching transistor T0 is controlled in known manner by a control circuit 4, inter alia, to stabilize the lamp current in the normal operating phase wherein an arc discharge continually takes place in the lamp, i.e. when the lamp is "ON".

The driver 100 further comprises a commutation circuit 5 having an input receiving the current supplied by chopper 3, which acts as a current source. In the embodiment shown, the commutation circuit 5 comprises a first branch of two switching transistors T1, T2 connected in series between the two input terminals of the commutation circuit 5, with a first node P1 between the two switching transistors T1, T2, and a second branch of two switching transistors T3, T4 connected in series between the two input terminals of the commutation circuit 5, with a second node P2 between the two switching transistors T3, T4. The commutation circuit 5 further comprises a diagonal branch connected between the two nodes P1 and P2, comprising lamp output terminals for connecting a lamp L, an inductor L2 arranged in series with the lamp output terminals, and a lamp capacitor C3 arranged parallel to the lamp output terminals.

A controller 6 controls the switching of the four switching transistors T1-T4. In the normal operating phase, wherein an arc discharge permanently takes place in the lamp L, so that the lamp is "ON", the control circuit 6 supplies a comparatively low frequency switching voltage to the switching transistors T1-T4, such that either the diagonally opposite transistors T1 and T4 are turned on while the other two transistors T2 and T3 are turned off, or vice versa, as a result of which a square-wave supply voltage having a comparatively small or comparatively moderate amplitude is supplied to the lamp; typically, the lamp voltage is of the order of about 70 to 130 V. In this normal operating phase or steady-state phase, the switching frequency will be referred to as steady-state commutation frequency. This frequency may typically be of the order of about 40 to 200 Hz, although higher frequencies are also possible.

The normal operating phase is preceded by an ignition phase, during which the lamp is ignited by a high-voltage signal. Again, the controller 6 generates control signals for the switching transistors T1-T4 so as to turn them on in a pair-wise manner, i.e. either T1-T4 or T2-T3 are turned on, but now the switching frequency is higher so as to excite the series resonance circuit defined by inductor L2 and lamp capacitor C3. In resonance, this series resonance circuit develops a resonant high-voltage signal across the lamp capacitor C3 at a voltage amplitude which is capable of igniting a discharge in the lamp L. The exact value of this voltage amplitude depends on the switching frequency, as will be explained with reference to FIG. 2.

Figure 2:
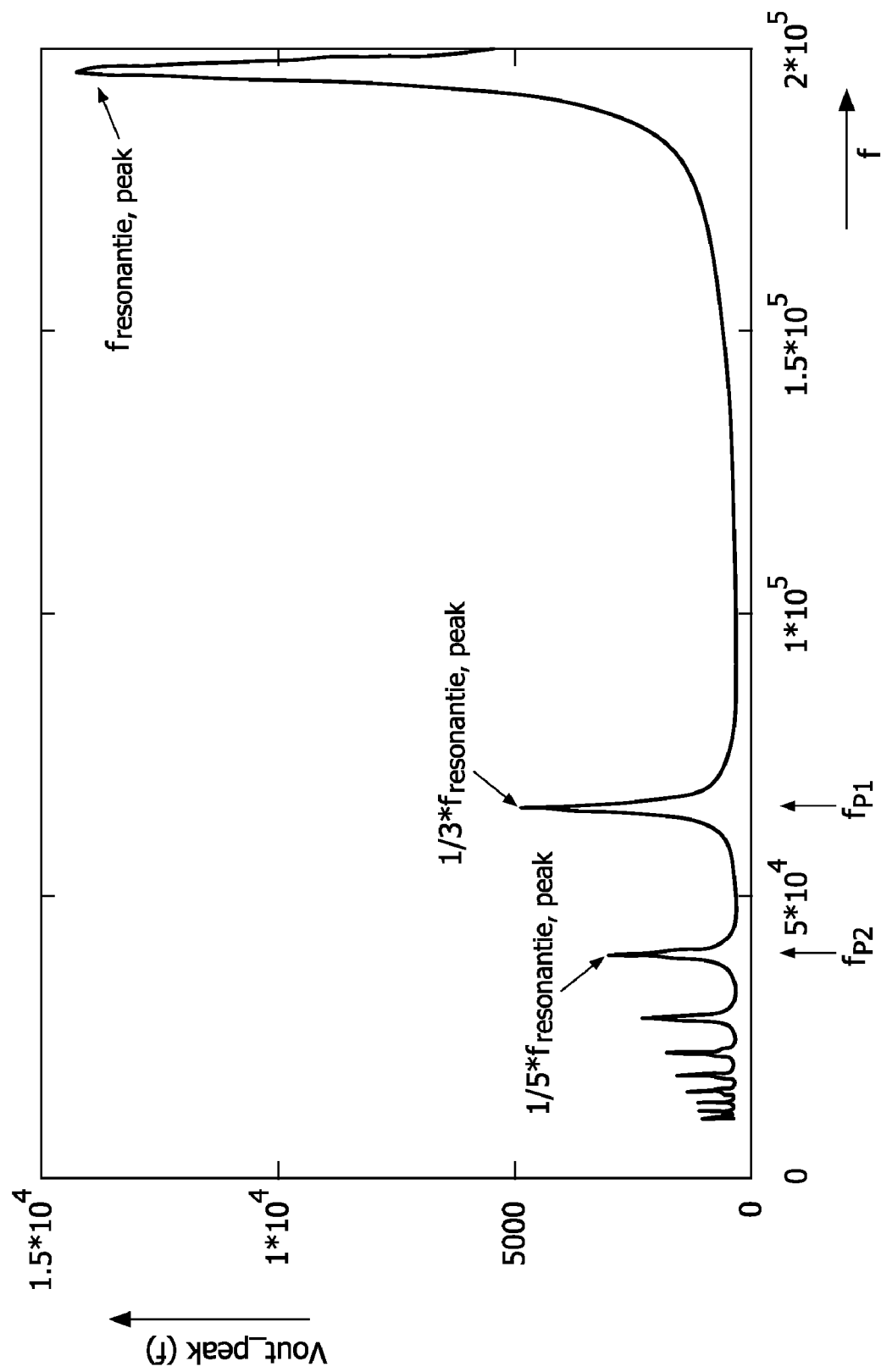
FIG. 2 is a graph showing the ignition voltage as a function of the frequency.

FIG. 2 is a graph showing the calculated results of the voltage amplitude across the lamp terminals (vertical axis, in [Volt]) as a function of the switching frequency f (horizontal axis, in [Hz]), for an example of a combination of the inductor L2 at 300 µH and the lamp capacitor C3 at 2.2 nF. It can be seen that this voltage shows a series of distinctive peaks, wherein the LC resonance frequency is an odd harmonic of the switching frequency. The extreme right peak in the Figure corresponds to the resonance frequency of this example of the inductor/capacitor combination, which will be indicated as $f_R$ and, in this case, is approximately 200 kHz; the corresponding ignition voltage is almost 15 kV, which would be too high for normal gas discharge lamps.

A second peak at a frequency of about 70 kHz corresponds to ⅓ of the resonance frequency of this inductor/capacitor combination, or $f_R/3$; the corresponding ignition voltage is almost 5 kV, which would be suitable for a hot restrike of the gas discharge lamps.

A third peak at a frequency of about 40 kHz corresponds to $f_R/5$; the corresponding ignition voltage is almost 3 kV, which would be suitable for cold ignition of the gas discharge lamps.

The Figure shows further peaks at $f_R/7$, $f_R/9$, etc. of the resonance frequency, always at a decreasing peak voltage.

It is noted that the resonance frequency (determined by $1/\{2 \cdot \pi \cdot \sqrt{LC}\}$) may have a different value for different combinations of L2 and C3. However, the general aspects illustrated in FIG. 2 remain valid, i.e. the voltage across the lamp capacitor C3 will show peaks at a switching frequency of $f_R/n$, wherein n is an odd integer, and the peak resonance voltage decreases at a decreasing peak resonance frequency. Based on this finding, the present invention proposes selection of two different peak frequency values $f_{P1}=f_R/n1$ and $f_{P2}=f_R/n2$, with n2>n1, and use of $f_{P1}$ for a hot restrike and $f_{P2}$ for cold ignition.

In the present example, n1=3 and n2=5. It is noted that the resonance peak at $f_R/3$ is the first peak below the resonance frequency $f_R$. However, it is not necessary that n1 is always equal to 3; depending on design, component values and lamp requirements, n1 may be equal to 1 or to another odd integer>3. Typically, however, n1 will be selected in such a way that the corresponding resonant ignition voltage is of the order of about 5 kV.

Furthermore, it is noted that the two peaks at $f_{P1}$ and $f_{P2}$ are neighboring peaks in this example. This is not necessary either. Typically, however, n2 will be selected in such a way that the corresponding resonant ignition voltage is of the order of about 2 to 3 kV.

The values of $f_{P1}$ and $f_{P2}$ are fixed in a memory 7 associated with the controller 6. These values may have been written in the memory on manufacture of the device, adapted to the actual resonance frequency $f_R$. These values may also be written in the memory as design values, in which case deviations of the actual resonance frequency $f_R$ caused by tolerances are accepted. In an initialization procedure, the controller 6 may also be capable of measuring the actual resonance frequency $f_R$, calculating the suitable values of $f_{P1}$ and $f_{P2}$ and storing them in the memory 7.

During operation, when the lamp L is OFF and the controller 6 receives a command to start the lamp, the controller 6 performs either a hot restrike ignition by operating the switches T1-T4 at the first predetermined peak frequency $f_{P1}$ or a cold ignition by operating the switches T1-T4 at the second predetermined peak frequency $f_{P2}$. Two possible methods for implementing this procedure are illustrated in the flow diagrams shown in FIGS. 3 and 4. In all of these methods, the controller monitors whether the ignition procedure succeeds in igniting the lamp, and, as soon as this happens, the ignition procedure is discontinued and the controller moves on to a take-over and steady state; this is not illustrated in the Figures.

Figure 3:
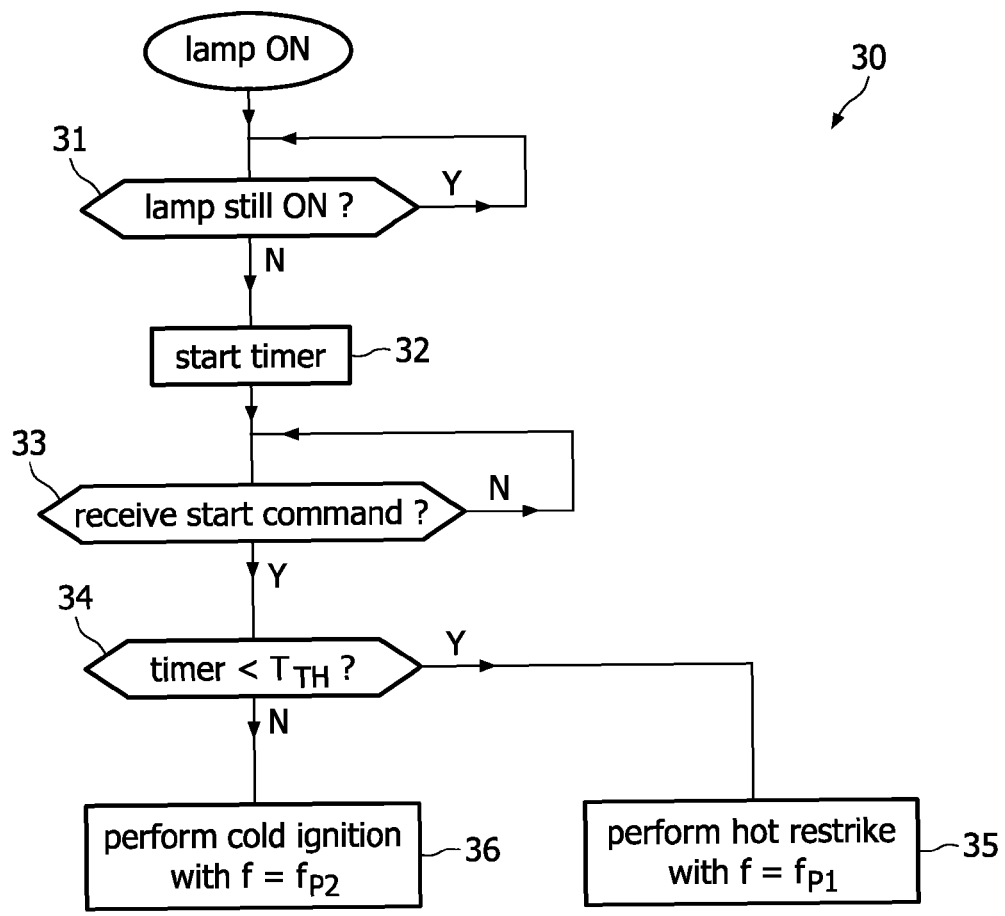
FIG. 3 is a flow diagram illustrating a first ignition method.

FIG. 3 illustrates a first ignition method 30. It is assumed that, initially, the lamp is ON. In step 31, the controller 6 monitors whether the lamp remains ON. If in step 31 the controller 6 finds that the lamp extinguishes, the controller 6 starts a timer [step 32] and waits for a command to re-ignite the lamp [step 33]. Alternatively, the controller 6 may automatically try to re-ignite the lamp on finding that it extinguishes without this being intended.

Before actually starting the ignition by operating the switches T1-T4, the controller 6 checks the timer value by comparing this value with a predetermined threshold time $T_{TH}$ [step 34]. When the timer value indicates that the lamp has not been OFF long enough, indicating that the lamp should be considered hot, the controller 6 performs a hot-restrike ignition procedure by operating the switches T1-T4 at the first predetermined peak frequency $f_{P1}$ [step 35]. Otherwise, when the timer value indicates that the lamp has been OFF long enough, indicating that the lamp should be considered cold, the controller 6 performs a cold-ignition procedure by operating the switches T1-T4 at the second predetermined peak frequency $f_{P2}$ [step 36].

Said threshold time $T_{TH}$ is not critical and may be selected to be of the order of, for instance, about 5 minutes. Depending on the lamp type, the threshold time $T_{TH}$ may be shorter or longer than 5 minutes. The controller 6 may also be associated with a memory containing a list of threshold times depending on the lamp type. Generally, a suitable value for the threshold time $T_{TH}$ will be in the range of 1 to 15 minutes.

Figure 4:
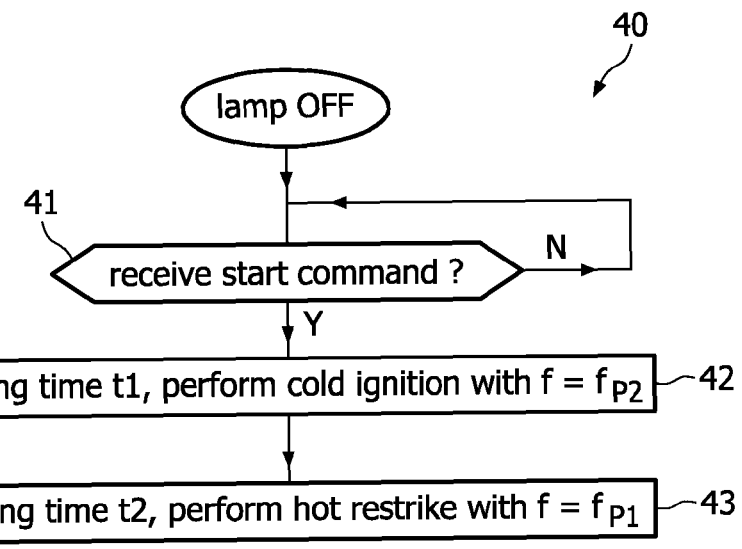
FIG. 4 is a flow diagram illustrating a second ignition method.

FIG. 4 illustrates a second ignition method 40. It is assumed that, initially, the lamp is OFF. The controller 6 waits for a command to re-ignite the lamp [step 41]. After the controller 6 has received this command, it first performs a cold-ignition procedure during a first period of time t1 by operating the switches T1-T4 at the second predetermined peak frequency $f_{P2}$ [step 42]. The duration of the first period of time t1 is not critical and may be in the range of, for instance, 1 ms to 1 s; a suitable value is of the order of, for instance, about 500 ms. If the lamp was actually cold, it should start within this first period, in which case the ignition procedure 40 is discontinued, as mentioned hereinbefore. If the lamp has not ignited at the end of this first period of time t1, indicating that the lamp was actually hot or has problems igniting for other reasons, the controller 6 continues to perform a hot-restrike ignition procedure by operating the switches T1-T4 at the first predetermined peak frequency $f_{P1}$ [step 43]. In this case, too, the ignition procedure may be discontinued after a second period of time t2, which may also have a duration of the order of, for instance, about 500 ms: if the lamp still does not ignite, there may be something wrong and the ignition procedure should be ended, or the lamp should be given a rest after which ignition should be tried again; it is noted that the same may apply to steps 35 and 36.

In summary, the present invention provides a driver apparatus 100 for driving a gas discharge lamp L, comprising a commutator circuit 5 having a bridge topology with four switches T1-T4 controlled by a controller 6, with an inductor L2 arranged in series with the lamp and a capacitor C3 arranged in parallel with the lamp, the inductor L2 and the capacitor C3 having a parallel resonance frequency $f_R$. In a steady-state mode, the controller drives the four switches T1-T4 at a relatively low commutation frequency of the order of 100 Hz. For igniting the lamp when it is still hot, the controller drives the four switches T1-T4 at a first ignition frequency $f_{P1}=f_R/n1$, n1 being an odd integer. For igniting the lamp when it is cold, the controller drives the four switches T1-T4 at a second ignition frequency $f_{P2}=f_R/n2$, n2 being an odd integer larger than n1.

While the invention has been illustrated and described in detail in the drawings and the foregoing description, it should be clear to a person skilled in the art that such an illustration and description are to be considered illustrative or as examples only. The invention is not limited to the disclosed embodiments; several variations and modifications are possible within the protective scope of the invention as defined in the appended claims.

The controller may have more than two operational frequencies available for ignition. For instance, with reference to the method 40 in FIG. 4, ignition may be tried at a still higher third frequency and at a still higher peak voltage if ignition also fails with the first frequency $f_{P1}$.

Furthermore, instead of a full bridge with four switches, the invention may also be implemented in a half-bridge configuration with two switches.

Other variations of the disclosed embodiments can be understood and effected by those skilled in the art in practicing the claimed invention, from a study of the drawings, the disclosure, and the appended claims. In the claims, use of the verb "comprise" and its conjugations does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The present invention has been explained with reference to block diagrams which illustrate functional blocks of the device according to the invention. It is to be understood that one or more of these functional blocks may be implemented in hardware, in which the function of such a block is performed by individual hardware components. However, one or more of these functional blocks may also be implemented in software, so that the function of such a block is performed by one or more program lines of a computer program or a programmable device such as a microprocessor, a microcontroller, a digital signal processor, etc.

The invention claimed is:

1. A driver apparatus for driving a gas discharge lamp (L), the apparatus comprising a commutator circuit, comprising:
   input terminals for receiving an input current,
   a branch comprising lamp connection terminals for connecting the lamp (L), with an inductor (L2) arranged in series with the lamp connection terminals and a capacitor (C3) arranged in parallel with the lamp connection terminals, the inductor (L2) and the capacitor (C3) having a parallel resonance frequency $f_R$; and
   a controller for controlling said commutator circuit (5) so as to alternate between a first state, in which the lamp current has a first direction, and a second state, in which the lamp current has a second direction; wherein the controller (6) is capable of operating:
      in a steady-state mode in which alternating between said first state and said second state takes place at a relatively low commutation frequency;
      in a hot-restrike ignition mode in which alternating between said first state and said second state takes place at a first ignition frequency $f_{P1}=f_R/n1$, n1 being an odd integer; and
      in a cold-ignition mode in which alternating between said first state and said second state takes place at a second ignition frequency $f_{P2}=f_R/n2$, n2 being an odd integer larger than n1.

2. A driver apparatus according to claim 1, wherein, in response to ignition of the lamp, the controller (6) is designed to make a transition from the ignition mode to the steady-state mode.

3. A driver apparatus according to claim 1, wherein the commutator circuit comprises:
   a first branch of two series-arranged controllable switches (T1, T2) connected between said two input terminals,
   a second branch of two series-arranged controllable switches (T3, T4) connected between said two input terminals,
   a diagonal branch comprising the lamp connection terminals for connecting the lamp (L);
   wherein the controller (6) is designed to control said controllable switches (T1, T2, T3, T4) so as to alternate between a first state, in which a first switch (T1) of the first branch and the diagonally opposite second switch (T4) of the second branch are both conductive while the two other switches (T2, T3) are non-conductive, and a second state, in which the second switch (T2) of the first branch and the diagonally opposite first switch (T3) of the second branch are both conductive while the two other switches (T1, T4) are non-conductive.

4. A driver apparatus according to claim 1, wherein, with the lamp in the OFF state, the controller determines whether the lamp is in a cold or in a hot state, and to select, either the cold-ignition mode or the hot-restrike ignition mode for igniting the lamp, based on the state of the lamp.

5. A driver apparatus according to claim 4, wherein, with the lamp being switched OFF, the controller (6) is designed to start a timer (step 32) so as to compare the timer value with a predefined threshold time ($T_{TH}$) (step 34), and to operate in the hot-restrike ignition mode if the timer value is smaller than the threshold time ($T_{TH}$) and to operate in the cold-ignition mode if the timer value is larger than the threshold time ($T_{TH}$).

6. A driver apparatus according to claim 5, wherein the threshold time ($T_{TH}$) is in the range of 1 to 15 minutes, preferably of the order of about 5 minutes.

7. A driver apparatus according to claim 1, wherein the controller (6) is designed to first operate in the cold-ignition mode for a first predetermined period of time (t1) and to continue operating in the hot-restrike ignition mode if the lamp has not ignited during the first predetermined period of time (t1).

8. A driver apparatus according to claim 7, wherein the first predetermined period of time (t1) is in the range of 1 ms to 1 sec, preferably of the order of about 500 ms.

9. A driver apparatus according to claim 7, wherein the controller (6) is designed to continue operating in the hot-restrike ignition mode until the lamp ignites.

10. A driver apparatus according to claim 7, wherein the controller (6) is designed to operate in the hot-restrike ignition mode for a second predetermined period of time (t2) and to discontinue the ignition process if the lamp has not ignited during the second predetermined period of time (t2).

* * * * *